Aug. 27, 1963
V. ALEKS
3,101,804
PORTABLE STANDUP TYPE BATHROOM SCALE
Filed May 23, 1960
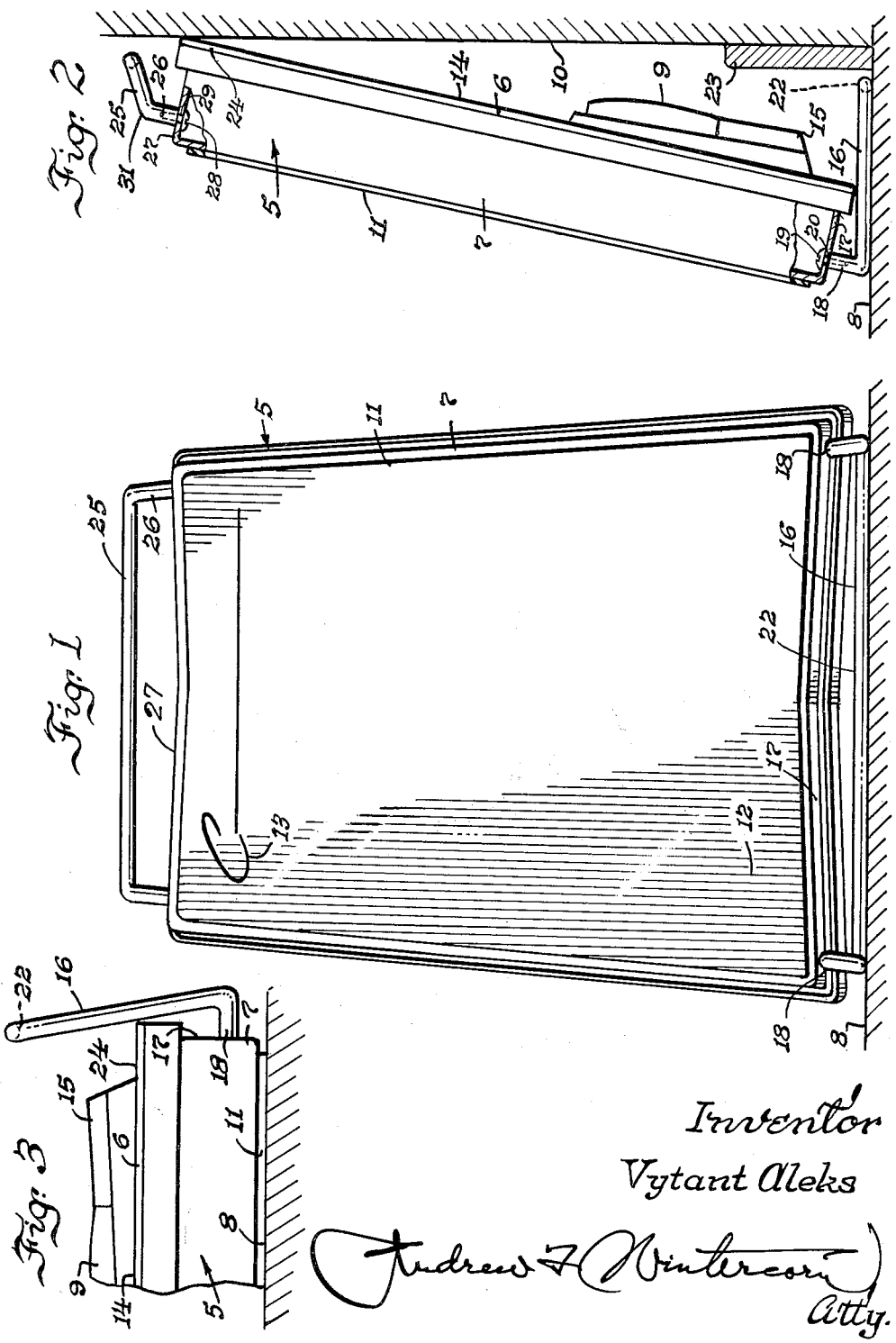
Inventor
Vytant Aleks
Andrew F. Wintercorn
Atty.

United States Patent Office 3,101,804
Patented Aug. 27, 1963

3,101,804
PORTABLE STANDUP TYPE BATHROOM SCALE
Vytant Aleks, Rockford, Ill., assignor to The Brearley Company, Rockford, Ill., a corporation of Illinois
Filed May 23, 1960, Ser. No. 31,082
3 Claims. (Cl. 177—239)

This invention relates to a bathroom scales and is more particularly concerned with a portable standup type bathroom scale wherein the stand or base forms a part of the assembly and in no way interferes with its normal usage on the floor but enables it to be stood on and next to the wall when not in use to be out of the way and give additional floor space, which in many instances is much needed, especially in the smaller bathrooms in modern homes and apartments, the portability of the scale also being a big advantage from the standpoint of economy, a single scale being useful in various places to get the maximum service from it.

I am aware that others have devised bathroom scales that are fastened to the wall and are arranged to be swung outwardly onto the floor for use but that arrangement makes it necessary for special provisions for locating the scale far enough away from the wall in its unfolded position for more comfortable use, and these additional provisions add too much to the cost of the unit besides depriving it of its portability, and it is generally conceded that most purchasers of bathroom scales prefer the unit to be portable so that it can be used wherever preferred. The stand of my invention is accordingly designed to retain the important feature of portability and still have all of the other advantages desired without too much increase in cost.

The invention is illustrated in the accompanying drawing, in which—

FIGS. 1 and 2 are a rear view and side view, respectively, of a portable bathroom scale of the standup type made in accordance with my invention, shown in the upright position, FIG. 2 showing the floor and wall in cross-section to better illustrate the relationship of the scale thereto in the upright position, and FIG. 3 is a fragmentary side view showing only the front end portion of the scale in the horizontal position on the floor as when in use, to illustrate the fact that the stand or auxiliary supporting base in that position is not at all in the way and serves also as a convenient carrying handle.

The same reference numerals are used to designate corresponding parts in these three views.

Referring to the drawing, the bathroom scale designated generally by the reference numeral 5 may be considered to be of any conventional type having a platform 6 on which the person to be weighed stands while the base 7 is disposed in a substantially horizontal position resting on a floor 8, the platform 6 being supported on a system of levers fulcrumed in the base 7, as illustrated, for example in Provi Patents Nos. 2,667,387 and 2,668,-045, whereby to stretch a weighing spring, the elongation of which is measured and through suitable intermediate mechanism indicated on a rotary dial, a portion of which is seen through a lens 9 mounted in an opening provided in the front end portion of the platform 6. The base 7 usually has rubber pads or feet on the bottom thereof at the four corners to provide good anti-slip support for the scale on the floor for safer use of the scale but where, as here, the bottom of the scale will be fully exposed to view while the scale is stood up next to a wall 10, as illustrated in FIG. 2, a rubber pad 11 is preferably provided and may be and preferably is suitably ornamented for improved appearance, as indicated at 12, and the trademark of the manufacturer may also be displayed, as indicated at 13, in addition to such marking on the top 14 of the platform 6 or on the cover plate 15, so that whether the scale is stood up, as in FIG. 2, or rests on the floor, as in FIG. 3, the trademark of the manufacturer is always prominently displayed.

In accordance with my invention, in order to make a portable standup type bathroom scale out of an otherwise ordinary horizontal type bathroom scale, I provide a generally U-shaped wire frame 16 serving as an auxiliary supporting base or stand for the scale and also as a convenient carrying handle, the same being disposed in front of the base 7 and secured to the front wall 17 by inwardly bent end portions 18 which have threaded holes longitudinally thereof receiving screws 19 entered through holes 20 in said front wall. The arms of the U 16 are purposely made only long enough to give the desired stability to the base or stand 16 and, as seen in FIG. 2, when the cross-portion 22 of the U 16, which serves as a carrying handle, is adjacent or abutting the baseboard 23, the remote rear end of the platform 6 will be close to if not abutting the wall 10, so that the scale takes up a minimum amount of space when stood up to be out of the way, and yet there is no danger of the scale being banged against the wall 10 and marring the same, especially since the pad 24 usually provided on top of the platform will ordinarily serve as a buffer in the event of such contact. A U-shaped pickup and carrying handle 25 of U-shaped wire construction is provided on the rear end of the base 7 and has the inwardly bent end portions 26 of the arms of the U secured to the rear wall 27 of the base, similarly as the base or stand 16, namely, by screws 28 threaded in holes extending longitudinally of portions 26 and entered through holes 29 in the base. The handle 25 obviously does not interfere at all with a person getting onto or off the scale in weighing, and yet it is amply exposed in the upright position of the scale, as illustrated in FIG. 2, for convenience in grasping the same.

It is, therefore, a simple matter in the operation of the scale to pick it up by its handle 25 when it is standing next to the wall and place it in a horizontal position on the floor for use wherever desired. After use, the scale can be picked up and carried by grasping the handle at either end, the upward bend of the handle 25 indicated at 31 in FIG. 2 making the grasping of this handle much easier than it would otherwise be, without however interfering with one getting onto or off the platform in weighing. Inasmuch as the scale in its upright position, as seen in FIG. 2, is inclined toward the wall, it is obvious that there is no danger of it being accidentally knocked over, because if the scale is contacted from the rear in that position with sufficient force to knock it over it will come into abutment with the wall and will, therefore, be supported also if a stool or other object falls against the scale while it is standing next to the wall. The serviceable bottom pad 11 will afford a good bumper, protecting the scale against damage, whereas, if the other side of the scale were exposed, the lens 9 might be broken or the cover plate 15 dented in the event of a sufficiently violent blow.

It is believed the foregoing description conveys a good understanding of the objects and advantages of my invention. The appended claims have been drawn to cover all legitimate modifications and adaptations.

I claim:

1. A portable bathroom scale comprising a supporting base of generally rectangular form, a generally rectangular platform connected in assembled relation to the base but supported on and movable downwardly with respect thereto in a weighing operation when the base and platform are horizontally disposed for use in weighing with the base resting on a floor, said scale being constructed to be adapted for use only in a horizontal position resting on a floor and to permit its being stood on end on the floor, one end of said scale being its forward end and the other its rearward end in the weighing operation, and a generally U-shaped member of approximately the same width as one end of said base and disposed in a plane at less than a right angle to the plane of the scale and in spaced transverse relationship to one end thereof and having the ends of the arms thereof directed toward and rigidly secured to the end of the base, the cross-portion of the U-shaped member being spaced outwardly from and substantially parallel to the platform and adapted to serve as a lifting and carrying handle, said U-shaped member being adapted to serve as an auxiliary base on which to support the scale when it is stood on end when not in use.

2. A portable bathroom scale as set forth in claim 1 including a lifting and carrying handle on that end of the scale which is uppermost when the scale is disposed on end.

3. A portable bathroom scale as set forth in claim 1 in which the supporting base and platform are of tapered width longitudinally, narrower at the rear end and wider at the forward end, the generally U-shaped member being on the wider forward end and of a width approximately the same as that end, whereby to provide greater stability for the scale in the upright position supported on said U-shaped member.

References Cited in the file of this patent
UNITED STATES PATENTS

| | | |
|---|---|---|
| 1,042,159 | Simmons | Oct. 22, 1912 |
| 2,181,272 | Greenleaf | Nov. 28, 1939 |
| 2,641,460 | Larson | June 9, 1953 |
| 2,954,196 | Slager | Sept. 27, 1960 |